March 6, 1934.  N. A. HALLWOOD  1,950,238

SCALE

Filed Feb. 7, 1930  2 Sheets-Sheet 1

Inventor
N. A. Hallwood
By W. D. McDowell
Attorney

March 6, 1934.   N. A. HALLWOOD   1,950,238
SCALE
Filed Feb. 7, 1930    2 Sheets-Sheet 2
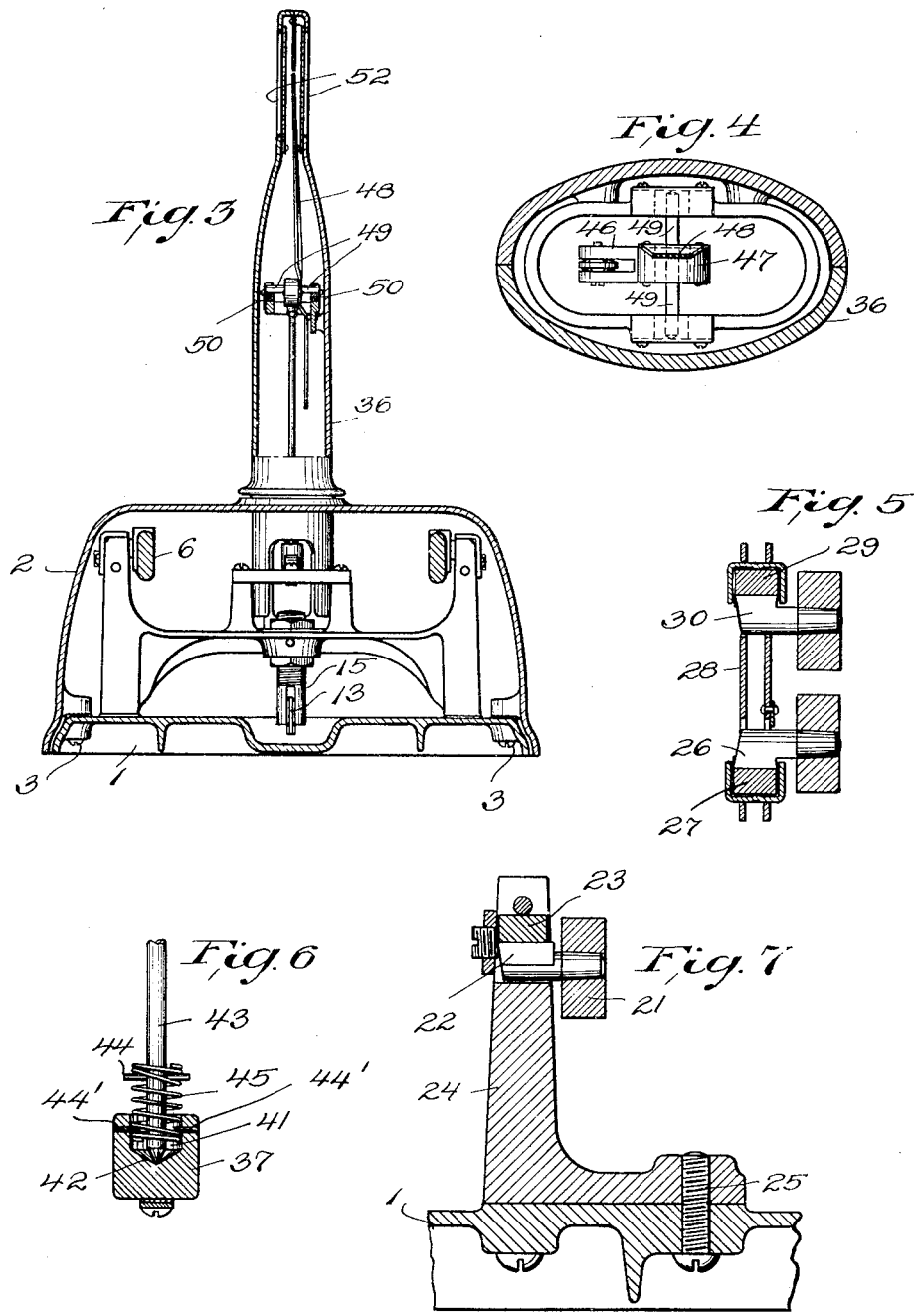
Inventor
N. A. Hallwood
By W. S. McDowell
Attorney Patented Mar. 6, 1934

1,950,238

UNITED STATES PATENT OFFICE 1,950,238

SCALE

Nathan A. Hallwood, Columbus, Ohio

Application February 7, 1930, Serial No. 426,689

4 Claims. (Cl. 265—59)

This invention relates to improvements in weighing scales of the so-called even balance type wherein a pivoted beam mechanism is provided and to the opposite ends of which are applied known and determined weights, whereby when said weights are substantially equal to each other the beam mechanism assumes a balanced position and whereby through associated indicating mechanism this balanced position may be conveniently determined.

In most even balance scales of this type the scales have been of limited capacity for the reason that weight receivers, pivotally carried by the outer ends of their supporting beams have had but a single connection with such beams and which connection has been provided in substantially the center of the weight receivers. This customary construction has resulted in limiting the size and area particularly of the commodity weight receiver on which the determinable weights are placed, and it is a primary object of the present invention to provide an even balance scale with an enlarged commodity receiver for the reception of the determinable weight and wherein a compound lever mechanism is associated with said commodity receiver and with one end of the pivoted beam to provide for a uniform distribution of weights and stresses on the beam so that the knife edged trunnions of the beam will be maintained in their supporting bearings for efficient operation irrespective of the weights applied to the commodity receiver or the relative positions which such weights assume on said latter receiver.

Figure 1:
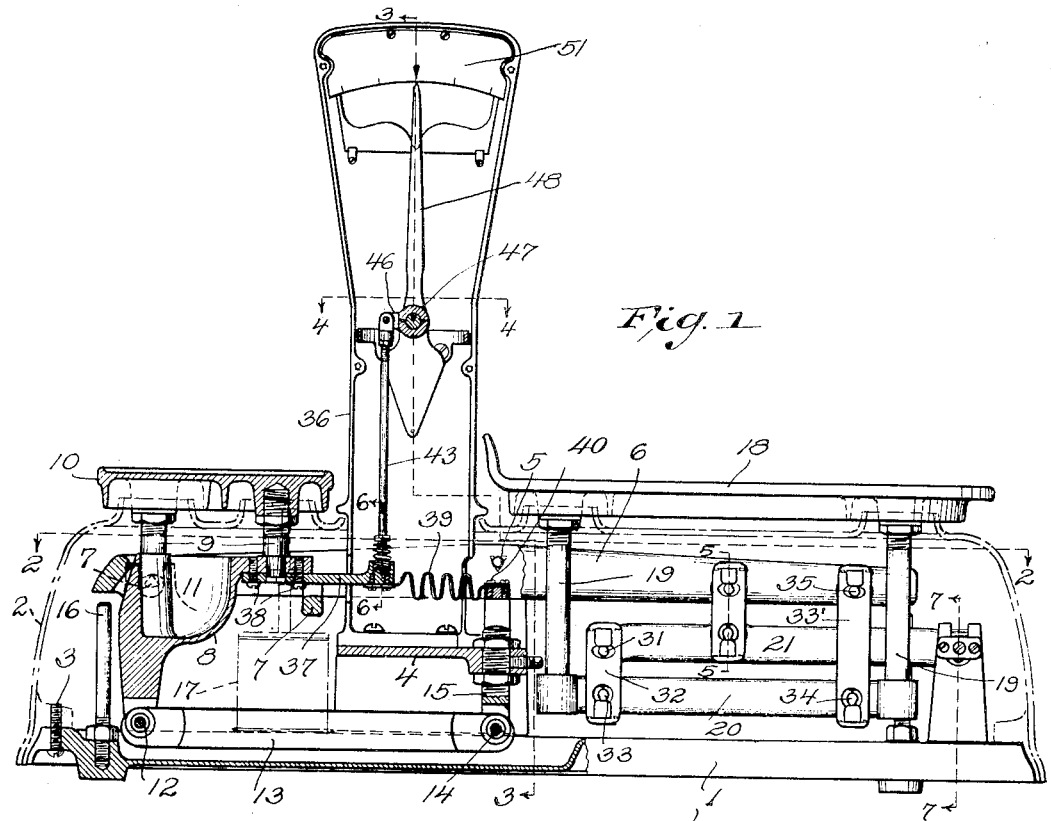

For a further understanding of the invention reference is to be had to the following description and the accompanying drawings, wherein:

Figure 1 is a vertical longitudinal sectional view taken through a weighing scale of the even balance type constructed in accordance with the features of the present invention.

Figure 2:
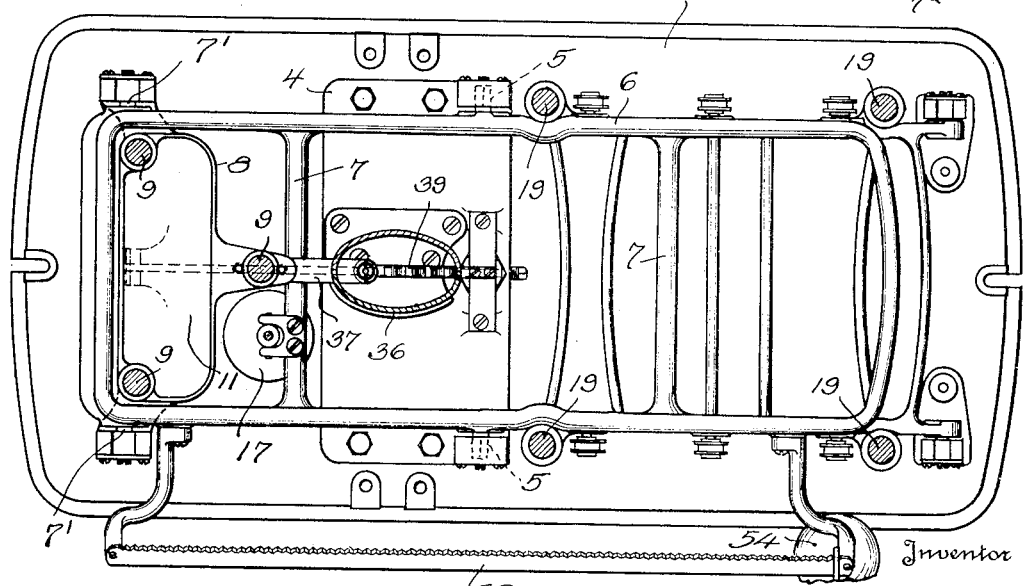

Figure 2 is a horizontal sectional view taken on the plane disclosed by the line 2—2 of Figure 1, Figure 3 is a vertical transverse sectional view taken through the scale on the line 3—3 of Figure 1, Figure 4 is a horizontal sectional view taken through the indicating tower of the scale on the line 4—4 of Figure 1, Figure 5 is a vertical sectional view on the plane indicated by the line 5—5 of Figure 1, Figure 6 is a detail vertical sectional view on the plane indicated by the line 6—6 of Figure 1, and Figure 7 is a similar view on the line 7—7 of Figure 1.

Referring to the drawings, the numeral 1 indicates the base of the scale which is preferably in the form of a metallic casting and which is suitably ribbed or flanged to possess the necessary degree of mechanical strength without involving unnecessary weight. Adapted to be connected with and to cover the base 1 is the housing 2 of the scale which consists, also, of a metal casting of hollow formation and which is open along its lower side to receive the base 1 and the mechanism supported thereby. Screws or other fasteners 3 may be employed to connect the housing in secured engagement with the base 1.

Mounted on the base 1 and arranged within the housing 2 is a stationary frame 4. The upper and outer side members of the frame 4 are formed to include fulcrum blocks adapted for the reception of the knife edge fulcrums 5 which project from the intermediate portions of the beam 6 which is of the so-called even balance type.

The beam 6 is of substantial rectangular frame construction being suitably braced at intervals throughout its length by transversely extending struts 7. By its pivotal connection with the frame 4 the beam oscillates vertically when its opposite ends are unequally weighted from a normal horizontal plane. That end of the beam which receives the known or fixed weight is provided with inverted trunnions 7' of the knife edge type which effect the pivoted suspension of an out-rider 8. This out-rider, within the confines of the beam, is provided with a plurality of upstanding studs 9, preferably 3 in number. To the upper ends of these studs there is secured a weight receiver 10, arranged above the housing 2 and upon which the known weights are applied. The out-rider may be provided with a pocket 11 adapted for the reception of lead or other weight producing bodies which are used in balancing the beam 6.

The lower end of the out-rider 8 is pivotally connected as at 12 to the outer end of a check rod 13, arranged in the lower part of the housing 2. The inner end of this check rod is pivotally connected as at 14 to a threaded post 15, which is adjustably carried by the frame 4. The check rod 13 serves to maintain the weight receiver 10 in a true horizontal position in and near its weight positions. The base 1 is provided with upstanding stop members 16, which are normally spaced from the beam 6 but which are engaged by the latter to limit the degree of oscillation of the beam. A dash pot 17 is connected with one of the cross struts 7 of the beam and serves, as usual, to dampen the oscillation of the beam when the latter responds to applied weights.

The commodity receiving platform or weight receiver 18 in the present scale is of unusually large size and in this instance it is considerably larger than the weight receiver 10. This is done in order that the scale may be employed for the weighing of heavy commodities as well as light ones. In the ordinary form of even balance scale adapted to be positioned on a store counter or the like, it is limited ordinarily to the weighing of light bodies or materials, and it is one of the principal objects of the present invention to provide a sensitive even balance scale which can be successfully employed for the weighing of commodities throughout a wide weight range which range will be materially in excess of that customarily found in even balance scales of this type.

To this end the platform 18 is provided with four depending posts 19 which have their upper threaded ends received within sockets provided therefor in the under portions of the platform 18, the posts being arranged vertically in spaced rectangular order within the housing 2. The lower ends of these posts are carried within sockets formed in connection with a rectangular floating frame 20 which is supported from the beam 6 and an oscillating lever member 21. This lever member, as shown in Figures 1, 2 and 7, is provided at one end with a pair of knife edge trunnions 22, which are inverted so that their knife edges project upwardly and contact with hardened steel bearing blocks 23 mounted in the upper ends of brackets 24 which are secured to the base 1 as at 25.

Intermediately of its length the lever member 21 is provided with a pair of downturned knife edge trunnions 26, as shown in Figures 1 and 5, which engage with bearing blocks 27 seated in the lower portions of a pair of vertically arranged links 28. The upper ends of the links 28 receive bearing blocks 29 with which engage the inverted or up-turned knife edge trunnions 30 which project from the sides of the beam 6, whereby the links 28 serve to effect the fulcrumed support of the lever member 21 from the beam 6.

The outer ends of the lever member 21 or the ends thereof spaced farthest from the trunnions 22 are provided with up-turned knife edge trunnions 31 which engage with blocks mounted within vertically extending links 32. The lower ends of these links are equipped with blocks which engage with down-turned knife edge trunnions 33 projecting horizontally and rigidly from the floating frame 20. Similarly, links 33' have their lower ends provided with blocks for the reception of the down-turned knife edge trunnions 34 projecting horizontally from the opposite ends of the frame 20, and the upper ends of the links 33 are provided with blocks with which engage the up-turned knife edge trunnions 35 which project from the beam 6. By this compound lever arrangement commodities to be weighed may be placed at any point on the platform 18 without affecting the accuracy of the scale and furthermore due to its enlarged area and the substantial construction provided for its support from one end of the beam 6, commodities of high weight may be placed on the platform for correct weighing operations. The compound levers provided prevent such large weights from throwing excessive strains and friction onto the trunnions of the scale so that the latter are permitted to function with their customary freedom and with complete absence of error producing strains.

The indicating mechanism consists of a stationary tower 36 which is mounted on the frame 4 of the base. This tower is located between the weight receivers 10 and 18, as is customary, but in this instance the vertical center line of the tower is off-set laterally with respect to the knife edge fulcrums 5 of the beam 6. By thus off-setting the tower 36 toward one end of the scale greater room is provided for the enlarged commodity receiving platform 18.

The indicating mechanism within the tower comprises a horizontally extending arm 37 which is secured as at 38 to the out-rider 8. The arm 37 terminates within the tower 36 and is connected with the free end of a corrugated leaf spring 39, the fixed end of the spring being mounted as at 40 in connection with the frame 4. The normal function of the spring 39 is to maintain the beam 6 in a normal or horizontal position when the opposite ends of the beam are equally weighted.

The end of the arm 37 in the tower 36 is provided with a socket 41 which terminates in a conical seat 42. Arranged to be positioned in this seat is the tapering end of a vertically extending rod 43. The lower end of this rod is provided with a cross pin 44 with which engages the upper end of a contractile spring 45 which in turn has its lower end held in connection with the arm 37 by diametrically opposite pins 44' carried by the arm and engaging the convolutions of the spring which operates to maintain the lower pointed end of the rod 43 in engagement with the seat 42. This construction is desirable when the beam or out-rider 8 oscillates rapidly.

The upper end of the rod 43 is connected with a crank arm 46 which extends from the hub 47 of an indicator 48. The hub of the indicator is provided with horizontally extending knife trunnions 49 seated in connection with stationary bearings 50 carried by the inner walls of the tower 36. The upper end of the indicator 48 is arranged for travel over an arcuate graduated surface 51 which is viewable through transparent panels positioned in openings 52 provided in the upper portion of the tower 36. It will be seen that as the beam oscillates from a normal position a movement thereof may be noted by comparing the relative positions of the indicator 48 with reference to the graduated surface 51. When the beam is balanced the indicator occupies a center position with respect to the surface 51, and as the beam oscillates from its normal or balanced position the indicator moves toward and away from its normal center position in relation to the surface 51. By connecting the indicator operating mechanism with the out-rider 8 advantage is taken of the extreme movement of the beam for providing the multiplying motion of the indicator. This permits slight deviations of the beam from its normal position to be instantly noted by reference to the indicator so that the scale, when properly used, is extremely sensitive in the matter of determining accurately as well as quickly the comparative weight values.

The beam 6 carries at one side thereof the usual rack 53 upon which is mounted the adjustable poise 54 which is used in the determination of smaller weights such as ounces. Fixed weights in the form of pounds are applied as usual to the receiver 10, and these fixed weights are ordinarily carefully checked to determine their exact weight values.

While I have described what I consider to be the preferred embodiment of the invention, nevertheless it will be understood that the embodiment illustrated and described has been selected merely as an example of one of the many possible forms which the scale may assume in its commercial development, and I therefore claim as my invention all of such variations or modifications of the scale from the form herein depicted which may be said to fall fairly within the scope and spirit of the following claims.

What is claimed is:

1. In a weighing scale, a base, a beam pivotally mounted intermediately of its ends upon said base, an out-rider pivotally connected with one of the ends of said beam and provided with a weight receiver for the reception of a known weight, a plurality of pivotally connected levers co-operative with the opposite end of said beam and base, a weight receiver of greater size than said first named receiver supported by said levers, and a check rod pivotally connected at one end with said out-rider and pivotally connected at its opposite end with said base in vertical registration with the pivotal connection between said base and said beam.

2. In a weighing scale, a base, a beam pivotally mounted intermediately of its ends upon said base for limited swinging movement in a vertical plane, an out-rider pivotally carried by one end of said beam and provided with a weight receiver for the reception of known weights, a check rod pivotally connected at one end with said out-rider in a plane below said beam, the other end of said check rod being pivotally connected with said base below and in substantially vertical registration with the pivotal connection between said beam and base, a second weight receiver, and compound lever mechanism having a pivotal connection with said base and suspended from said beam, said lever mechanism having posts arising therefrom for effecting the support of said last named weight receiver.

3. In a weighing scale, a base, a beam pivotally mounted intermediately of its ends upon said base, a known weight receiver pivotally supported in connection with one end of said beam, an unknown weight receiver pivotally supported in connection with the opposite end of said beam, a compound lever structure consisting of a floating frame, a plurality of spaced vertical posts between said floating frame and the unknown weight receiver for the support of the latter, a lever pivotally suspended from said beam, pivoted link connections between said lever and frame, pivoted link connections between said beam and said frame, a pivotal connection between one end of said lever and said base, and a check rod pivotally connected at one end with the known weight receiver and pivotally connected at its other end with said base in vertical registration with the pivotal connection between said beam and base.

4. In a weighing scale, a base, a beam pivotally mounted intermediately of its ends upon said base, an outrider pivotally connected with one of the ends of said beam and provided with a weight receiver for the reception of a known weight, a compound lever mechanism suspended from the other end of said beam and having a pivotal connection with said base, a weight receiver of greater size than said first named receiver supported by said compound lever, and a check rod pivotally connected at one end with said outrider and pivotally connected at its opposite end with said base.

NATHAN A. HALLWOOD.